(12) United States Patent
Aboujaoude et al.

(10) Patent No.: US 7,689,447 B1
(45) Date of Patent: Mar. 30, 2010

(54) WORKLIST INTEGRATION OF LOGICAL AND PHYSICAL TASKS

(75) Inventors: Roger Aboujaoude, Ocean Township, NJ (US); Hossein Eslambolchi, Los Altos Hills, CA (US); Ming-Chin Lu, Holmdel, NJ (US); John McCanuel, Bailey, CO (US); Jamie Montero, Tinton Falls, NJ (US); Sorabh Saxena, Hoboken, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 848 days.

(21) Appl. No.: 11/259,519

(22) Filed: Oct. 26, 2005

(51) Int. Cl.
*G06F 9/44* (2006.01)
(52) U.S. Cl. ......................................................... 705/7
(58) Field of Classification Search ....................... 705/7
See application file for complete search history.

(56) References Cited

U.S. PATENT DOCUMENTS

| | | | |
|---|---|---|---|
| 6,073,109 A * | 6/2000 | Flores et al. ................. | 705/8 |
| 6,301,655 B1 | 10/2001 | Manohar et al. | |
| 6,349,238 B1 * | 2/2002 | Gabbita et al. .............. | 700/101 |
| 6,732,167 B1 | 5/2004 | Swartz et al. | |
| 6,907,117 B2 | 6/2005 | Gilles | |
| 2002/0168054 A1 * | 11/2002 | Klos et al. .................. | 379/1.04 |
| 2003/0126148 A1 * | 7/2003 | Gropper et al. ............. | 707/100 |
| 2004/0015366 A1 * | 1/2004 | Wiseman et al. ............ | 705/1 |
| 2004/0117046 A1 * | 6/2004 | Colle et al. .................. | 700/99 |
| 2004/0187140 A1 * | 9/2004 | Aigner et al. ................ | 719/328 |
| 2005/0015619 A1 * | 1/2005 | Lee ............................. | 713/201 |

OTHER PUBLICATIONS

Special Edition Using Microsoft® Office® Project 2003 (Timothy W. Pyron, Ph.D., Que Publishing, Feb. 2004).*
Microsoft Office Project 2003 Inside Out (Teresa Stover, Microsoft Press, Oct. 2003).*
"Clock Speed" http: www.yale.edu/pcIt/PCHW/clockidea.htm.*
John et al ("Integrated maintenance management for communication networks-an AT&T solution," Global Telecommunications Conference, 1991. GLOBECOM '91. 'Countdown to the New Millennium, vol. 1, pp. 654-657, Dec. 2-5, 1991).*
Microsoft Office Project 2003 Inside Out (Teresa Stover, Microsoft Press, Oct., 2003, ISBN 0-7356-1958-1).*
C. Mohan ("Workflow Management in the Internet Age," slides of a lecture presented May 1999, downloaded from www.almaden.ibm.com/u/mohan/workflow.pdf on Apr. 28, 2009).*

(Continued)

*Primary Examiner*—Romain Jeanty
*Assistant Examiner*—George H Walker
(74) *Attorney, Agent, or Firm*—Hoffman & Baron, LLP

(57) ABSTRACT

A method and system of managing work flow in provisioning service orders is provided, particularly telecommunications service delivery orders, where each service order may include of tasks from different worklists from different sources. The method includes merging the worklists and prioritizing tasks in accordance with work-when-ready work flow. The merged worklist provides an end-to-end view on a graphical user interface of all tasks pending to provision each service order. A change of status of a task results in automatically updating both the native and merged worklists. When a task is completed on the native system, the task is automatically deleted from both worklists. Selected search criteria and sorting fields may be used to narrow the displayed results. New tasks created by exceptions are inserted appropriately into the active worklist. The method eliminates the need for a user to log onto different systems to manually prioritize tasks.

19 Claims, 2 Drawing Sheets

OTHER PUBLICATIONS

Ngu, A.H.H.; Georgakopoulos, D.; Baker, D.; Cichocki, A.; Desmarais, J.; Bates, P., "Advanced process-based component integration in Telcordia's Cable OSS," Data Engineering, 2002. Proceedings. 18th International Conference on, pp. 485-487, 2002.*

Ngu, A.H.H.; Georgakopoulos, D.; Baker, D.; Cichocki, A.; Desmarais, J.; Bates, P., "Advanced process-based component integration in Telcordia's Cable OSS," Data Engineering, 2002. Proceedings. 18th International Conference on, pp. 485-487, 2002.*

* cited by examiner

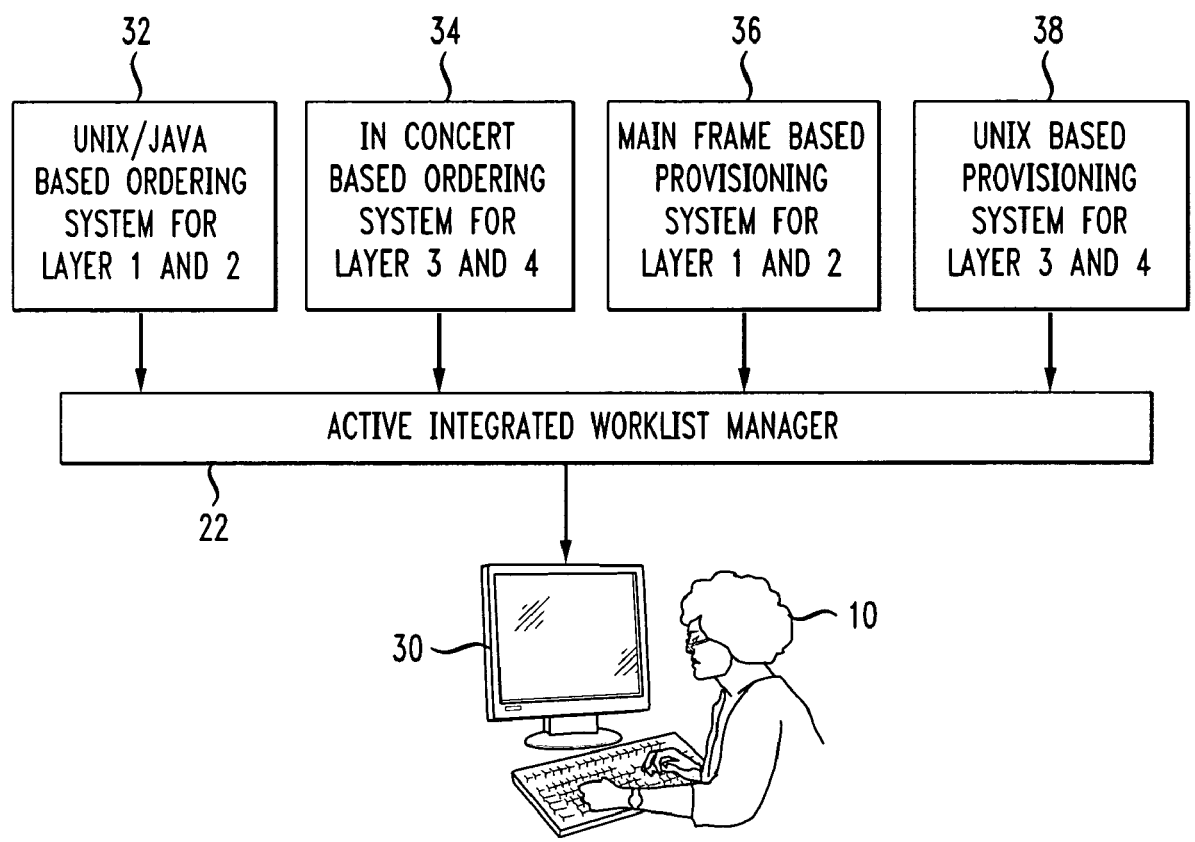

WORKLIST INTEGRATION OF LOGICAL AND PHYSICAL TASKS

FIELD OF THE INVENTION

The present invention relates to automated electronic processing and provisioning of telecommunications products and services, and particularly to the integration of logical and physical tasks from multiple worklists into a single dynamic worklist.

BACKGROUND OF THE INVENTION

The service delivery process for telecommunications service providers requires a sequential series of steps often performed by different work centers or stations. The work stations may be internal to the telecommunications service, but typically also include external sources such as Local Exchange Carriers (LEC), for example, to fill a customer's order. In some cases, one step must be completed in order to progress to the next. Therefore, coordination between the work stations to provision a placed order is typically accomplished using a "work-when-scheduled" logic flow: setting a standard work schedule, with static dates of completion for each task, based on an original estimated time of completion. In other words, the order does not progress to a subsequent task until the scheduled date, regardless of the lapse in time that may occur between the completion of one task and the start of the next task.

Though this procedure generally allows successful sequential passing of the order from one workstation to the next, it presents several disadvantages. For one, there is no flexibility to complete an order in advance of schedule, and if a task is not timely completed, manual adjustments to the work schedule must then be made. Therefore, the process is extremely inefficient.

With the advent of electronic documents and Internet-based ordering forms, it has been possible to significantly reduce the amount of human interaction and improve efficiency at least in the ordering process for numerous types of products and services, including telecommunications. In addition, maintaining work schedules in a computer database accessible via the Internet allows more flexibility in provisioning each order, i.e., in supplying the services associated with each order, and in adjusting the scheduled dates of completion should problems arise.

However, due to the historical evolution of the telecommunications industry from a single type of service and one service provider to a multitude of different service providers and services available, there will typically be several different work schedules which must be monitored for successful completion of an order for a particular service, i.e., for a service order. Furthermore, each work schedule may be prepared and maintained using a different computer application, which is typically a legacy application inherited from languages, platforms, and techniques that may not be current with existing technology. With new types of services continually emerging due to the rapid growth of telecommunications technology, the complexity in layering the new technology over the old is ever increasing. Consequently, the process for provisioning orders for these newer services has likewise grown in complexity.

One example of a more recent telecommunications service being offered is managed router service, which may interface with, for example, an asynchronous transfer mode (ATM) network. The router itself can be either a hardware device or a software application that routes a data packet on a corporation's Virtual Private Network (VPN) Intranet, for example. The data packet may contain voice-over Internet Protocol (IP), as well as data such as point of sale information, and credit card authorization data. Therefore, in provisioning an order for managed router service to a commercial customer, the retailer providing the service must typically coordinate between work centers to provide the ATM network, the IP telephony services, and integrate traditional transport circuits to connect between switching offices or service providers (Long Distance Providers (LDPs) and LECs) as needed.

Each work center providing these services generates and maintains its own worklist of tasks on a native application. Coordinating between the different work centers and users trying to complete the various tasks in each work center is a difficult task.

One conventional approach to dealing with the increasing complexity in provisioning such new services, is to replace the several legacy applications required to provision each type of new service with an entirely new application that integrates the various required services. Though this approach solves the problem of integrating several applications, it is costly and inefficient. In addition, a new application may have to be developed to accommodate each new emerging service. Finally, the development of one new work-when-scheduled application does not, in itself, solve the problem of how to interface between different service providers, or how to efficiently layer the new technology over the old in order to improve the work flow of the provisioning process.

There is a particular need, therefore, which is not provided for in the prior art, to provide a process for improving the work flow of a service delivery ordering and provisioning process, which requires coordination of completion of tasks between multiple worklists, particularly for use by telecommunications products and service providers.

SUMMARY OF THE INVENTION

The present invention, which addresses the needs of the prior art, provides an efficient method for improving the work flow of a service delivery ordering and provisioning process, particularly for use by telecommunications products and service providers. In particular, a method is provided to electronically coordinate the provisioning process between different work stations running different applications, often on different platforms. The method includes integrating both logical and physical tasks from multiple worklists into a single active worklist. Therefore, the method also eliminates the need for a user (someone working to provision a service order) to log on to different systems to manually prioritize his tasks.

In particular, the invention provides a method of managing work flow in provisioning a plurality of service orders, where each service order includes tasks to be provisioned, the tasks being associated with a plurality of worklists from different sources. Each worklist includes tasks to be completed in provisioning various service orders. The method includes merging the plurality of worklists and prioritizing tasks in the merged worklist in accordance with a work-when-ready work flow.

In one embodiment, an end-to-end view of all pending tasks required to provision each service order, or some portion thereof, may be displayed on a graphical user interface. A link is provided for each displayed task to the source generating the task.

The method may also include detecting a change of status of a task in one of the plurality of worklists, and automatically updating the merged worklist and the native worklist associated with the task in response to said detecting to reflect the detected change of status of the task.

For example, when completion of a task is detected, the merged active worklist and the native worklist from which the task originated are automatically updated by deleting the task from the merged worklist and the native worklist.

The method may also include searching the plurality of worklists in accordance with selected search criteria, and outputting a portion of the merged worklist to one of a graphical user interface and a file and a hardcopy in accordance with the selected search criteria.

The present invention also provides a system for managing work flow associated with provisioning a plurality of service orders and completing the tasks associated with the corresponding service orders. Each service order includes tasks associated with a plurality of worklists from different sources, and the plurality of worklists include tasks to be completed in provisioning a corresponding service order. The system includes a processing device, and a clock for tracking the timing of the tasks. The processor integrates the tasks from the plurality of worklists into an active worklist, and tracks and manages the timing of the tasks on a work-when-ready basis. The active worklist provides an end-to-end view of the corresponding service order. A display is also included for displaying at least a portion of the end-to-end view. The system further includes a computer-readable storage medium for storing the active worklist, which is constantly updated by the processor in response to a change in status of any one of the tasks from the plurality of worklists.

As a result, the present invention provides a system and method for electronically coordinating the provisioning process of service orders between different work stations running different applications and/or on different platforms, and managing the work flow on a work-when-ready basis. If one task finishes ahead of schedule, the next is automatically scheduled to avoid delay in the provisioning process.

BRIEF DESCRIPTION OF THE DRAWINGS

FIG. 3 is a block diagram showing another embodiment of the system utilizing a method in accordance with the present invention.

DETAILED DESCRIPTION OF THE PREFERRED EMBODIMENTS

Figure 1:
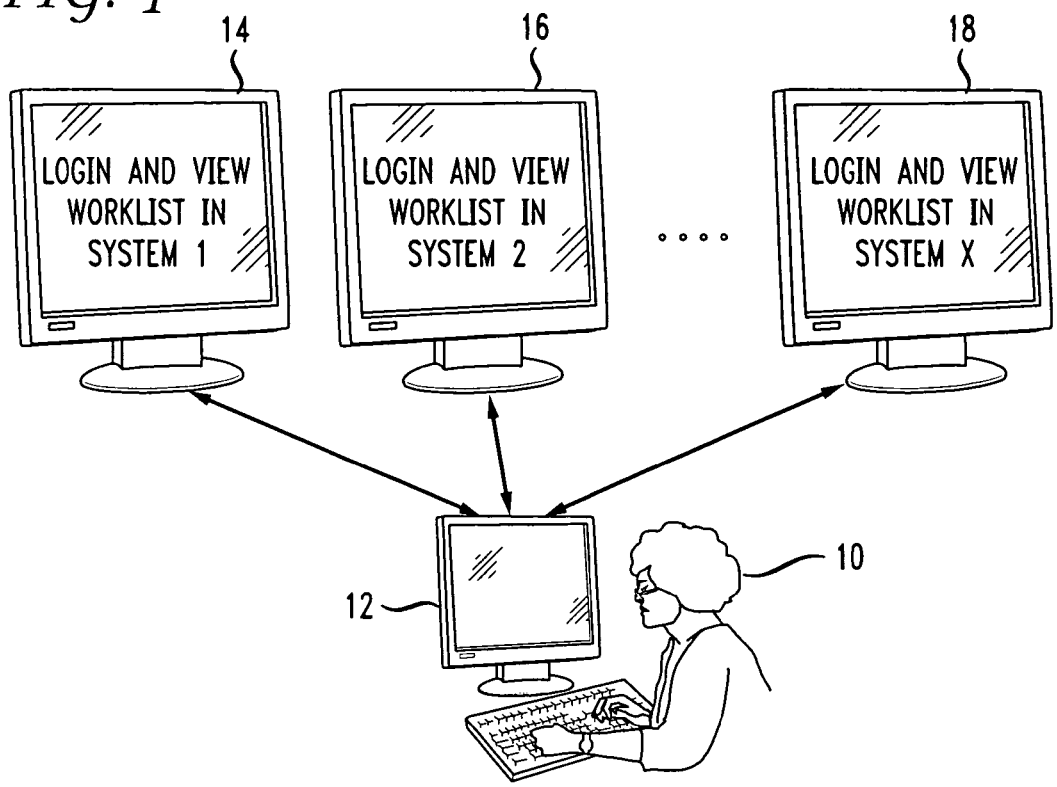
FIG. 1 is a block diagram of a system utilizing a prior art method of manually provisioning a service order.

There has been a recent trend in the telecommunications industry toward automating a significant portion of work involved in provisioning orders that have been placed. In the provisioning of more complex orders for emerging services, such as Voice-over Internet Protocol (IP), which are layered (at Layer 3, for example) over existing traditional services like ATM or frame relay at a Layer 2 and private lines such as T1 lines at Layer 1, such automation requires the integration of tasks generated on multiple worklists running on different sources, e.g., from different computer systems. The present invention provides a method for managing workflow in provisioning a service order by seamlessly integrating worklists from a plurality of existing sources generating the worklists into a single active worklist.

The traditional "work-when-scheduled" workflows may still be maintained on systems for some of the older technologies, for example, private line (T1) and frame relay service. These are typically maintained on separate systems using UNIX-type Cron Jobs, Java, and/or Perl Scripts. On the other hand, systems managing tasks for the emerging services, such as voice-over IP and managed router systems may utilize newer commercial off-the-shelf applications to control work flow.

As is well-known to those skilled in the art, Cron jobs are tasks scheduled to run at a scheduled time, and are located and initiated by a "Cron daemon," a background script which can run on UNIX, Linux or other operating systems, as is well-known to those skilled in the art. Perl and Java are both script programming languages with unique advantages. Perl offers a number of popular text manipulation capabilities, can be compiled to C-code before execution and interfaces well with UNIX-type operating systems. Java is a particularly useful script language especially known for offering easy interaction with Internet-based applications, such as Hyper Text Markup Language (HTML) source code, especially for adding dynamic content.

According to the method of the present invention, all tasks required to complete a plurality of service orders are merged into the active worklist. The active worklist provides, therefore, an integrated end-to-end view of all tasks, presented in the required sequential order of completion, necessary to provision a particular service order. Therefore, the active worklist is used to manage the timing of the tasks from the various sources generating the various worklists, often from different computer operating systems and platforms, to provide a work-when-ready work flow for each order. When a change of status occurs to any task, the active worklist is automatically updated along with the native worklist in which the task was generated. If the status of a task changes to completed, the task is removed from the active worklist, and preferably also from the native worklist. The user responsible for completing the next task in the provisioning sequence is put on notice that the next task is ready for his or her attention. The active worklist, therefore, is a useful tool for converting from the conventional "work-when-scheduled" logic to the more efficient "work-when-ready" flow.

In another aspect of the present invention, the active worklist eliminates the need for a user to manually check a number of passive worklists in order to prioritize his tasks or view the status of pending tasks. The user may be, for example, a telecommunications engineer, sales administrator, manager, or other telecommunications worker. The active worklist allows the user to selectively view tasks from the various worklists on one graphical user interface (GUI) corresponding to an identifier, such as a username or log in identification (ID), i.e., an alphanumeric identifier, or to other selective search criteria.

The method of the present invention is preferably implemented in a system operating an electronic factory, which adopts the methodology behind the traditional assembly line in which an item is first placed on the assembly line for processing. In analogy with a traditional factory, the item moves down the assembly line, stopping at each workstation along the line. Each workstation is manned by particularly skilled workers who perform one particular task in the process. Upon completion of one task at a workstation, the partially completed item progresses to the next workstation, while another follows in its stead. The efficiency of the assembly line rests in the fact that the tasks are divided up to be performed by those experienced in that particular task.

Similarly, in an electronic factory, an item or order is placed in a queue, usually by manually inputting required information into an internal ordering system via an electronic form on a computer terminal. The order is then processed by dividing it into a series of tasks, analogous to assembly line workstations, which must be completed in order to process and provision the order. Each of the tasks must be completed before proceeding to the next station. In the case of telecommunications service providers, coordination between several steps or tasks is required to fill a customer's order. In addition, the tasks are not necessarily all performed by the same entity, usually requiring interfacing and the passing of relevant information between various technology work centers, and usually between at least a service provider and a Local Exchange Carrier (LEC). Therefore, coordination between the various work centers and tracking of the order's progress is preferably accomplished by electronic means. In addition, system automation may complete many tasks, so that a telecommunications engineer is only notified of failures or exceptions. The engineer preferably fixes the problem and reinserts the order into the automated work flow. A description of such a system and method of automation and exception handling is provided in a co-owned U.S. patent application Ser. No. 11/215,277 filed on Aug. 30, 2005 by Aboujaoude, et al., which is incorporated herein by reference.

The method of the present invention provides a user of the system, i.e., a worker participating in the provisioning of the order, the ability to track the order's progress through the active integrated worklist, which can be viewed on a single graphical interface. The method additionally allows the user to easily toggle back and forth between a native worklist and a GUI displaying select portions of the active worklist.

FIG. 1 is provided by way of background to exemplify the conventional method and system used to provision a complex service order. A user 10 interacts with a computer system via a local computer workstation 12 to monitor the progress of an order and to search for tasks needed to be completed. One worklist is maintained on System 1 14 at Workcenter 1, another is maintained on System 2 16 at Workcenter 2, and so on, up to System X 18 at Workcenter X. Each worklist is a passive worklist, so that the user 10 has to access each one individually to search for work or to inquire about the status of a particular task. Though the various worklists may all be able to be opened at once on the user's workstation via an Internet connection, they are maintained on different graphical user interfaces, and are not interactive. Further, no "master list" of tasks exists. Therefore, users need to access several different systems and worklists to accomplish their assigned tasks and to view the progress of an order. The user must manually synthesize the information on the various worklists to determine the sequence of tasks he or she must complete. In addition, end-to-end measurements of the time interval between the time a Sales Administrator provided a quote to the time the first bill was issued are not possible.

Figure 2:
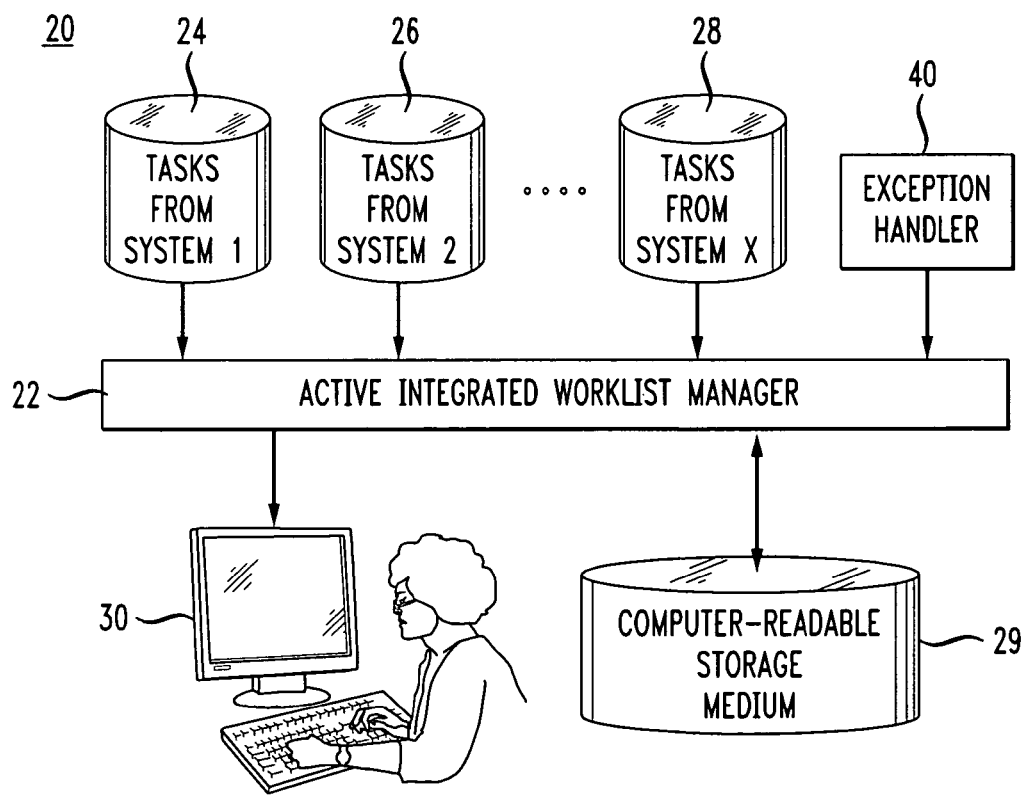
FIG. 2 is a block diagram showing a system utilizing an embodiment of the method of the present invention.

Referring to FIG. 2, a system 20 implementing the method of the present invention for improving the work flow in provisioning service orders includes an Active Worklist Integration Manager 22, which imports tasks from each worklist maintained on storage media on each system, for example, on System 1 24, System 2 26, and on a last System X 28. The Integration Manager 22 provides the active worklist, and tracks and manages the timing of the various tasks on a work-when-ready basis. The active worklist is preferably stored in a central database on computer-readable storage medium or media 29, which is constantly updated as the status of the tasks change. All of the imported tasks in the active worklist may be displayed at any time on a single GUI to show an end-to-end view of each service order. Alternatively, a portion of the active worklist may be viewed according to selected search criteria.

As shown in FIG. 2, a user logs into one system that compiles and tracks an integrated active worklist. The selected search criteria as well as sorting fields are preferably selected from an on screen menu, for example, a pull-down menu, accessible to the user, or by keyboard input, or by any other well-known means by which input parameters may be selected by a user for access by a set of executable instructions. The system actively searches all Systems 24 through 28 for the selected search criteria, for example, for the user's assigned Tasks, and recompiles and updates the active worklist. The retrieved part of the active worklist corresponding to the selected search criteria is sorted according to the user-selected fields for screen and/or hardcopy and/or file output. Sorting fields may include, for example, dates, customers, and/or circuits. Therefore, the system of the present invention eliminates the need for manual tracking and scheduling of the tasks. All tasks are presented when they are needed to the user in a logical flow, and status of tasks and orders can be presented as a single view across all of the systems generating the various worklists.

Referring also to FIG. 3, preferably, a search of each database for pending tasks is performed on each system to generate the active worklist at any one time. The search is preferably performed by initiating a series of executable instructions performed by a programmed microprocessor on the so-called originating system 30 by any means known to those skilled in the art. The originating system 30 preferably accesses call procedures from native or local databases stored on any computer readable storage medium or media local to each of the systems 24 through 28. The call procedures are then used to select and port the relevant data sorted by the selected search criteria to the originating system 30. Each call procedure is tailored to the particular system in which it is stored. Therefore, the active worklist and displayed portion thereof can be generated from a conglomeration of different applications running on different platforms.

Referring still to FIG. 3, in one particular embodiment, a UNIX/Java based ordering system is used on one system 32 to schedule tasks for more traditional services such as frame relay or ATM service. A second system 34 uses a more current commercial workflow application for provisioning voice-over IP and managed router systems and services. A third system 36 provides a main frame-based provisioning application for T1, and a fourth 38 provides a UNIX/Java application for voice-over IP and managed router services. All of the tasks and associated data are merged into one active worklist by the Active Integrated Worklist Manager 22 according to the system and method of the present invention. The active worklist is then available for selective searching and display on a single GUI by a user 10 logging into the system.

Referring also to FIG. 2, the system 20 also preferably includes an exception handler processing module 40 for detecting and managing errors or exceptions with a minimum of human intervention. The exception handler generates new tasks in each worklist as needed to correct the detected exceptions, as described by the Aboujaoude, et al. patent application Ser. No. 11/215,277. These new tasks are also merged, therefore, into the active worklist. The active worklist can be selectively searched to display all tasks from all worklists generated by the exception handler on one GUI.

In addition, the system preferably includes a clock which is started, for example, upon creation of the new corrective task. If a period of time elapses without the corrective action being completed, an alarm or warning is automatically generated. The warning can be automatically displayed on the integrated worklist and also mailed to an overseer or manager of the associated task, or to the supervisor of the worker assigned to completion of the corrective task.

The clock is also used to track the time interval between the completion of each task in the end-to-end view. Therefore, overdue tasks can be identified, for example, by selectively searching the active worklist for tasks pending for a period greater than a selected time interval.

According to the method of the present invention, the tasks are preferably presented in the active worklist in the order that they should be completed and assigned to the correct person to perform the task. The entire active worklist can then be searched according to selective search criteria, and sorted by selected sorting fields for viewing in a graphical user interface or outputting to a file, for example, to one of the off-the-shelf spread sheets known to those skilled in the art, or printing device. The available sorting fields include, but are not limited to, Customer (identified typically by name and Customer ID), order due date, task due date, and a user, e.g., one assigned to tasks, to aid in prioritizing work.

For example, the user can select all tasks for viewing which are marked as requiring the user's attention. In other words, the selected search criteria would include the user's name or ID. The user can then selectively access one of the tasks to work on from the displayed portion of the active worklist. In response to selectively accessing the task (by clicking on the task icon, e.g., or by other means known to those skilled in the art), the appropriate native system screen is invoked from the active worklist. The work, if it is logical work to be completed electronically on the computer operating system, is then completed by the user in the native environment. If the work is physical (manual) work, the user is granted access to manually change the status of the task when it has been completed by appropriate input to the native worklist. The system searches each native environment to detect the tasks that have been completed in real-time, and in response, removes the task from the active worklist, and preferably also from the native worklist displayed. Tasks that have been manually cancelled are considered completed and are also removed from the active and native worklists. Therefore, if an entire service order is cancelled, all tasks associated with the cancelled service order are cancelled, i.e., "completed," and removed from the worklists.

The merged view of tasks offered via the active worklist not only encompasses all the tasks, therefore, but also the status of each task. In another embodiment, a Telecom Engineer can view status of tasks for a particular premise. For example, the premise may require both a T1, Frame Relay or ATM port and a managed router. The active integrated worklist may be searched for the particular premise, and the status of the T1, Frame Relay/ATM port, and the managed router are then displayed in a combined view.

The method of the present invention further includes managing the timing of the tasks from various systems by actively searching the worklists on other systems for tasks that either have been generated or need to be generated based on a processing of exceptions or errors. Therefore, when a new task is generated to correct an error detected by an exception handling processor, the active worklist integration manager orchestrates the insertion of the new task in the proper position in the work flow using the end-to-end view of the active worklist. In other words, the new task is inserted according to a prioritized sequence that allows tasks to be completed according to any required sequential order of completion.

This use of the active worklist to provide a dynamically changing end-to-end view of the service delivery process advantageously enables tasks to be completed in faster succession, allows faster service delivery timeframe, and reduces cost. In addition, the status of a service delivery order can be tracked from the time Sales provided the quote to the customer, to the time service is delivered, and finally, to the time the Customer's bill is issued.

Preferably, the method for managing the work flow of the present invention also includes maintaining a log of all records of tasks generated and completed over a predetermined period of time. The log also preferably includes any errors or exceptions that occurred, along with the required correction. In this way, problematic areas in the provisioning process can be identified.

In another embodiment of the present method of managing work flow in provisioning services, the efficiency of a worker (user) is able to be tracked in one centralized place using the active worklist. For example, a manager having the authorization to view tasks assigned to workers under his or her supervision selects the search criteria for display from the active worklist, according to a user's ID, to view the volume of work assigned to the user at any given time. Alternatively, the search criteria can include a group name or ID assigned to all users under the manager's supervision, so that the work load of all users in that group can be compared. Finally, the log of tasks can be searched for all tasks assigned and completed by a particular user over a period of time to analyze the user's efficiency. Again, this can be performed on all users within a group to obtain a comparison between the workers efficiency rates.

It will be obvious to those skilled in the art that any of the information available from the active worklist can be used to generate a report and/or plot, such as the efficiency report discussed above, both on an on-screen GUI define somewhere as graphical user interface and in a hardcopy. Therefore, reports, plots and/or graphs may be generated to show, for example, the following: a number of exceptions occurring at regularly scheduled intervals over some time-period; the efficiency of various work centers, users, and groups; an increase or decrease in orders for a particular service; recurrence of particular hardware failures causing exceptions; and bottlenecks or trouble spots in the work flow in general.

In one embodiment, the active worklist for display is generated by an originating application on a system to which a user is logged on. The originating application calls a procedure stored in a database on a target system, which determines the worklist items or tasks from the target system to display on the originating system according to user-selectable search criteria. If the stored procedure were not invoked by the originating system, a user would have to monitor one worklist on the originating system and one on the target system.

Once the worklist items are displayed from the active worklist on one GUI on the originating system, the user can click on a link on the displayed worklist to invoke the corresponding task on the target application and to open the task in its native environment (target system). The user then completes the work in the native environment. Once completed, the target application preferably notifies the originating application automatically. In response, the originating application removes the task from the active worklist and from the user's screen, and preferably also from the target application.

For example, the stored procedure may be invoked from a Managed Services worklist screen, which displays tasks for provisioning managed routers and voice-over IP service. The stored procedure may be used to display any items including orders or tasks from the active worklist associated with search criteria input or selected by the user. The search criteria may include, for example, any of the following: login ID or other identifier of a user assigned to task; category of work; job level required to complete task; office/work center generating task; circuit type; customer name; order number; logged-in user ID; and name of service request.

An input parameter, for example, a login ID and preferably also a password, is used to apply access control to the active worklist database. This protective measure may be used, for example, to assure that only authorized users can view government market or other restrictive orders. Optionally, some other method of authorization control may be used in combination with the login and password to access certain orders, such as biometric input, including fingerprint scans.

Any of a number of parameters associated with the selective criteria may then be chosen for display in a GUI, and/or output to a report. For example, if a user chooses exceptions/errors as a sorting output field, and searches for a particular Customer number using the stored procedure, a listing is obtained of all outstanding exceptions that have occurred for service delivery orders for the selected Customer number. The exceptions are preferably further classified according to type in the stored database, so that they can be further categorized and sorted. Other selectable output fields include, but are not limited to: worklist (service) type; exception (e.g., fallout) type; date task entered; status; service order ID; order or customer number; product category; workcenter; name of LEC installing circuit; and scheduled date of completion.

The steps defining the method of the present invention are preferably performed by a programmed microprocessor executing instructions stored in or on a computer readable storage medium. One of ordinary skill in this art will recognize that such steps or functions are independent of the particular type of instruction set, storage medium, or microprocessor and may be performed by software, hardware, integrated circuits, firmware, microcode, and the like, or by any combination thereof.

Computer readable storage media referred to herein for storing procedures and databases associated with the active worklist may include various types of volatile and non-volatile storage media including but not limited to random access memory (RAM), read-only memory (ROM), programmable read-only memory (PROM), electrically programmable read-only memory (EPROM), electrically erasable read-only memory (EEPROM), flash memory, magnetic tape or disk, optical media, and the like.

Though the system and method of the present invention are described herein with reference to the provisioning of telecommunications services, it will be appreciated by those skilled in the art that the invention is not limited thereto. The present invention is applicable to any application that would benefit from the dynamic merging of multiple worklists into one active worklist.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of managing work flow, the method comprising:
provisioning a telecommunications service order that includes tasks generated in a plurality of worklists of different computing source systems, each computing source system maintaining an associated worklist that includes a task associated with the service order and a task associated with a different service order;
merging via a worklist manager of a processing device the tasks of the plurality of worklists from the different computing source systems into a merged worklist stored on a computer-readable storage medium of the processing device;
prioritizing via the worklist manager the tasks of the service order in the merged worklist into a prioritized sequence to be completed on a work-when-ready basis;
tracking via a clock of the processing device timing of the tasks in the merged worklist;
updating via the worklist manager the merged worklist in response to a change in status of any task in a worklist of a respective computing source system;
detecting via an exception handler of the processing device an error occurring in completion of a task by a computing source system in provisioning the service order;
generating via the exception handler a new task to correct the detected error;
integrating via the exception handler the new task into a proper position of the prioritized sequence in the merged worklist according to the work-when-ready basis; and
generating via the worklist manager a warning in the merged worklist when the new task in the prioritized sequence is not completed based on its status upon expiration of a predetermined period of time tracked by the worklist manager from the generation of the new task.

2. The method of claim 1, further comprising:
updating the worklist of the computing source system where the error occurred with the new task;
detecting a change of status of a task in one of the plurality of worklists; and
automatically updating the merged worklist and the one of the plurality of worklists in response to said detecting to reflect the detected change of status of the task.

3. The method of claim 2, wherein said detecting step comprises detecting completion of the task, and said automatically updating comprises deleting the task from the merged worklist and from the one of the plurality of worklists in response to said detecting completion of the task.

4. The method of claim 1, further comprising searching the plurality of worklists in accordance with selected search criteria, and outputting a portion of the merged worklist to one of a single graphical user interface and a file and a hardcopy in accordance with the selected search criteria.

5. The method of claim 4, wherein the selected search criteria comprise one of a user identifier, a category of work, a job level, a source generating one of the plurality of worklists, a service type, and a customer name or identifier.

6. The method of claim 5, wherein the selected search criteria comprises the user identifier, said outputting comprising outputting and prioritizing all tasks assigned to the user.

7. The method of claim 5, further comprising sorting the output portion of the merged worklist by at least one of a selected field.

8. The method of claim 7, wherein the at least one of the selected field comprises a due date, a date entered, a customer identifier, a service order type, a status identifier, a product category, and an exception type.

9. The method of claim 1, said merging comprising calling procedures stored on the different computing source systems to search the plurality of worklists for pending tasks.

10. The method of claim 1, further comprising
providing a link for each displayed task to a computing source system that generated each displayed task.

11. The method of claim 10, wherein said displaying comprises displaying an end-to-end view of all pending tasks required to provision the corresponding service order.

12. The method of claim 1, further comprising:
allowing a user to log onto an originating system on which the merged worklist is accessed;
user-initiated searching of the merged worklist according to selected search criteria;
displaying a portion of the merged worklist corresponding to the selected search criteria on a graphical user interface; and
providing a link on the graphical user interface for a displayed task to a computing source system of the different computing source systems generating the displayed task.

13. The method of claim 12, wherein the selected search criteria comprises a user identifier comprising an identification number or alphanumeric associated with the user, the method further comprising:
user-accessing the computing source system through the provided link;
user-completing the displayed task on the computing source system, wherein the displayed task is a logical task; and
automatically deleting the displayed task from the merged worklist in response to said user-completing.

14. The method of claim 12, wherein the selected search criteria comprises a user identifier associated with the user, the method further comprising:
user-accessing the computing source system through the provided link;
user-completing the displayed task manually, wherein the displayed task is a physical task;
user-changing a status of the displayed task manually on the one of the plurality of worklists on the computing source system to completed; and
automatically deleting the displayed task from the merged worklist in response to said user-changing the status to completed.

15. The method of claim 1, further comprising associating the new task with an appropriate user for completing the new task.

16. The method of claim 12, wherein the user is a manager of a group of workers, and wherein the selected search criteria comprises a group identifier associated with the group of workers, the method further comprising:
sorting the displayed portion of the merged worklist by an alphanumeric identifier associated with each worker in the group.

17. The method of claim 1, further comprising:
allowing a user to log on to a system for accessing the merged worklist by inputting at least one of an identifier and a password; and
limiting access to particular tasks associated with particular service orders in the merged worklist according to the at least one of the user identifier and password.

18. The method of claim 17, wherein the identifier comprises at least one of a biometric identifier and an alphanumeric identifier.

19. A system to manage work flow, the system comprising:
a plurality of computing source systems to provision a telecommunications service order, each respective computing source system maintaining a worklist that includes a task generated in association with the service order and a generated task associated with another service order;
a processing device comprising:
a worklist manager to integrate the task from the worklist of each respective computing source system into a merged worklist, the worklist manager to track and manage timing of tasks associated with the service order in the merged worklist in a prioritized sequence to be completed on a work-when-ready basis;
a clock to track the timing of the tasks in the merged worklist;
a computer-readable storage medium to store the merged worklist, the merged worklist of the storage medium being updated by the worklist manager in response to a change in status of any task in a worklist of a respective computing source system; and
an exception handler to detect errors occurring in completion of the tasks by the plurality of computing source systems in provisioning the service order, to generate new tasks to correct the detected errors, and to integrate the new tasks into proper positions of the prioritized sequence in the merged worklist to facilitate completion of the tasks in the prioritized sequence according to the work-when-ready basis, wherein the worklist manager is further to generate a warning in the merged worklist when a new task in the prioritized sequence is not completed based on its status upon expiration of a predetermined period of time tracked by the worklist manager from the generation of the new task by the exception handler.

* * * * *